T. VEGA Y VEGA.
SOWING MACHINE.
APPLICATION FILED MAY 21, 1913.
1,098,416.
Patented June 2, 1914.
4 SHEETS—SHEET 1.
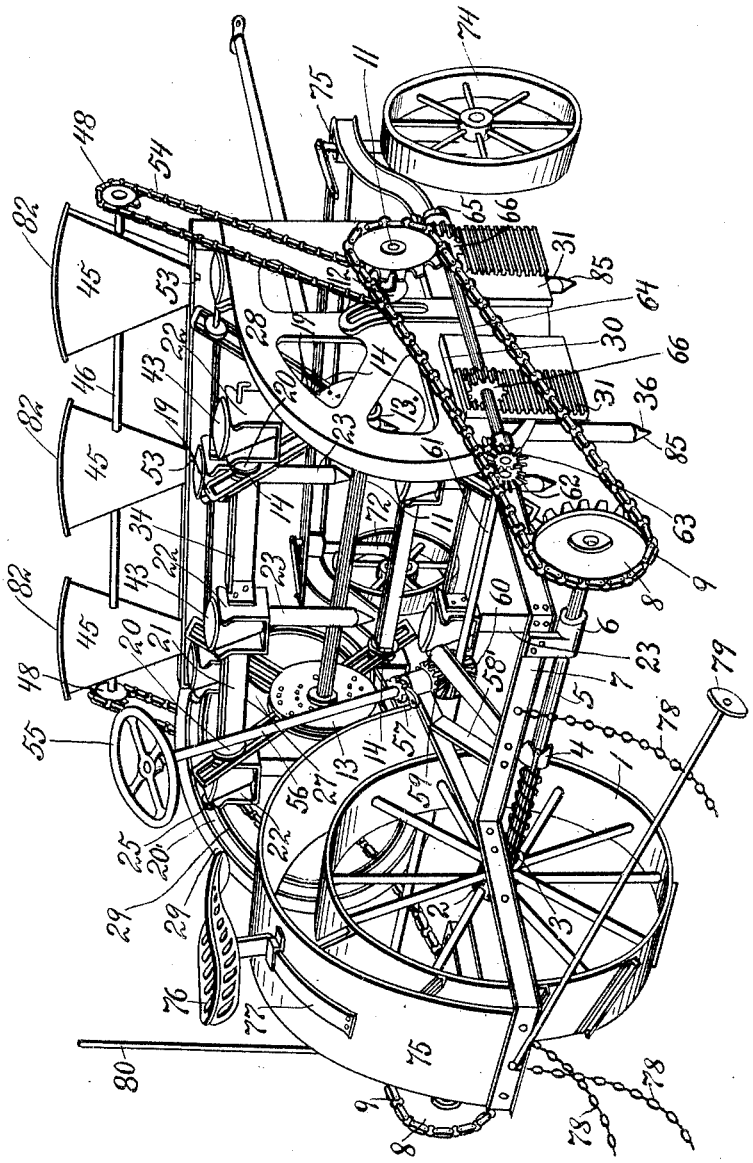
WITNESSES:
Cornelius Hoving
John H. Hoving
INVENTOR
TOMÁS VEGA Y VEGA
BY H. van Oldenneel
ATTORNEY

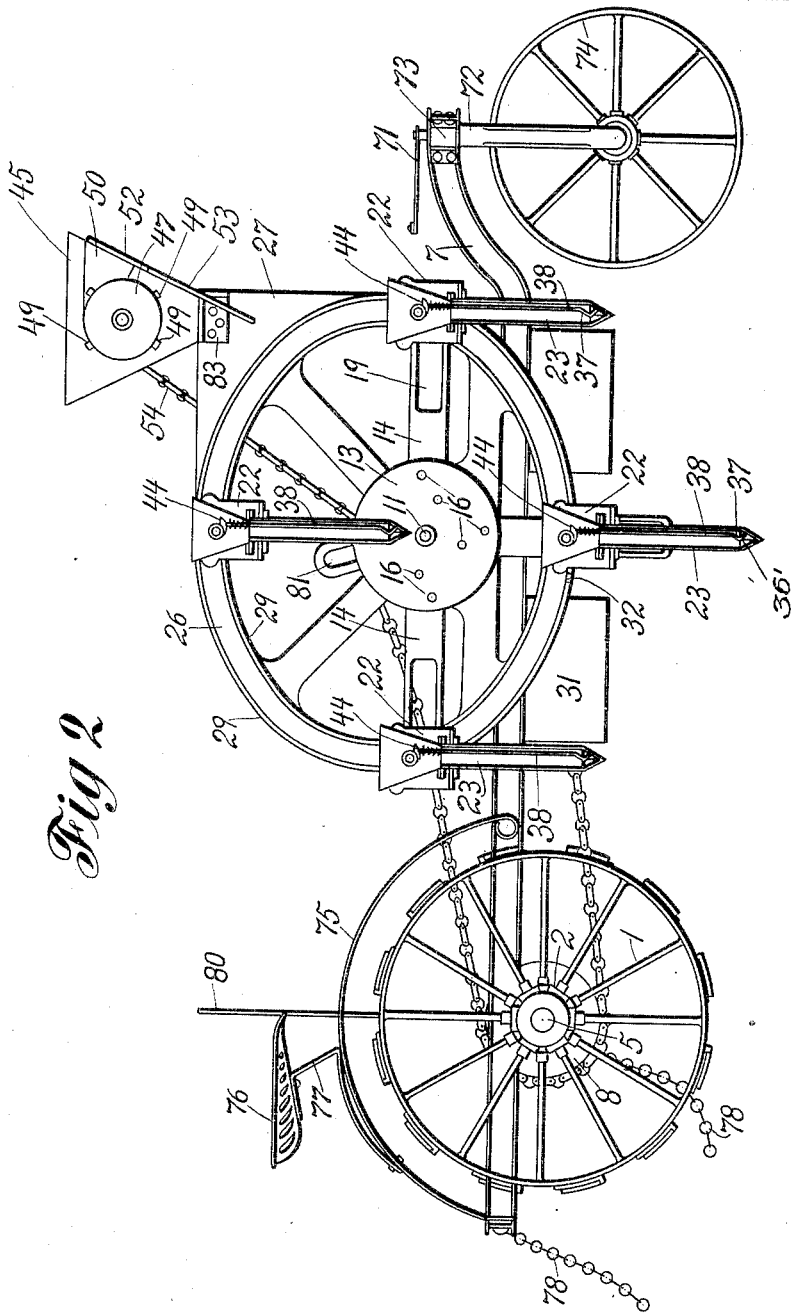

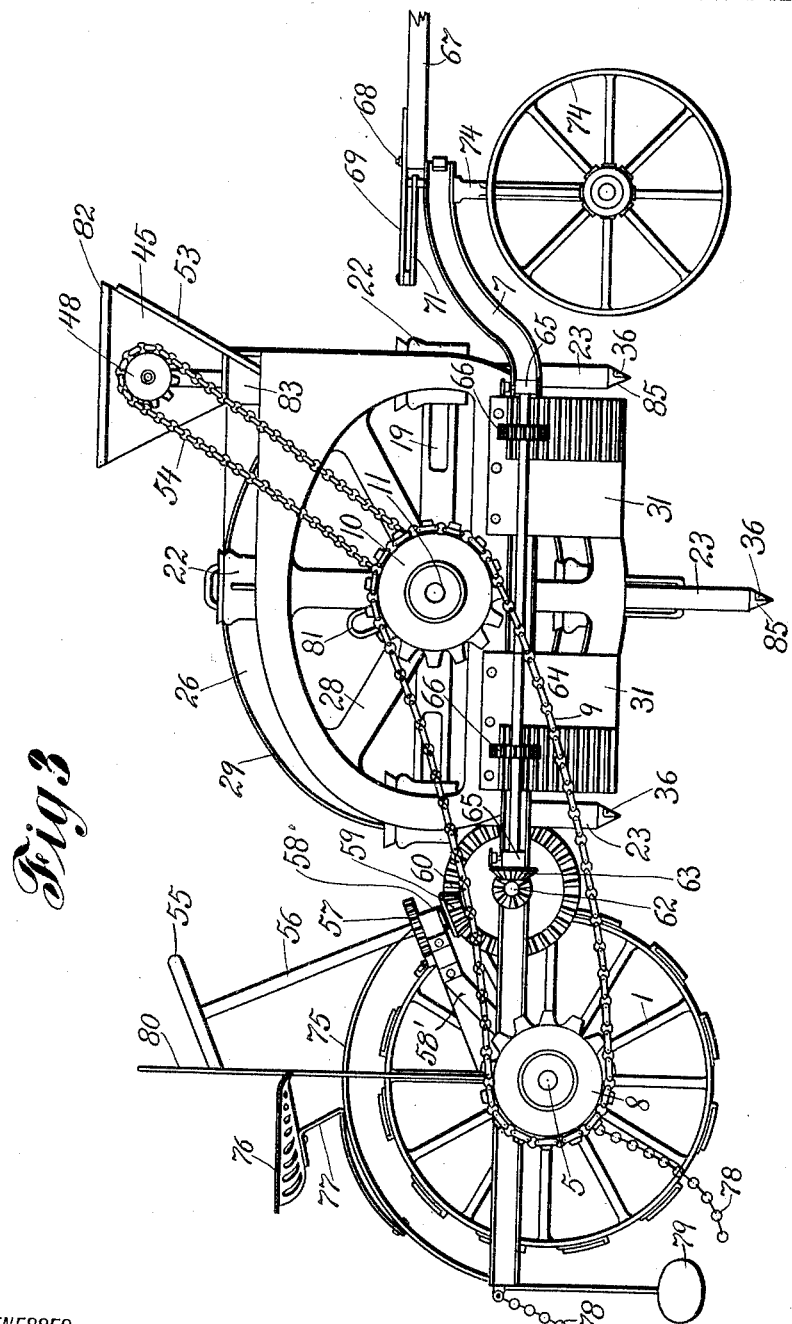
T. VEGA Y VEGA.
SOWING MACHINE.
APPLICATION FILED MAY 21, 1913.
1,098,416.
Patented June 2, 1914.
4 SHEETS—SHEET 3.
WITNESSES:
INVENTOR
TOMÁS VEGA Y VEGA
ATTORNEY

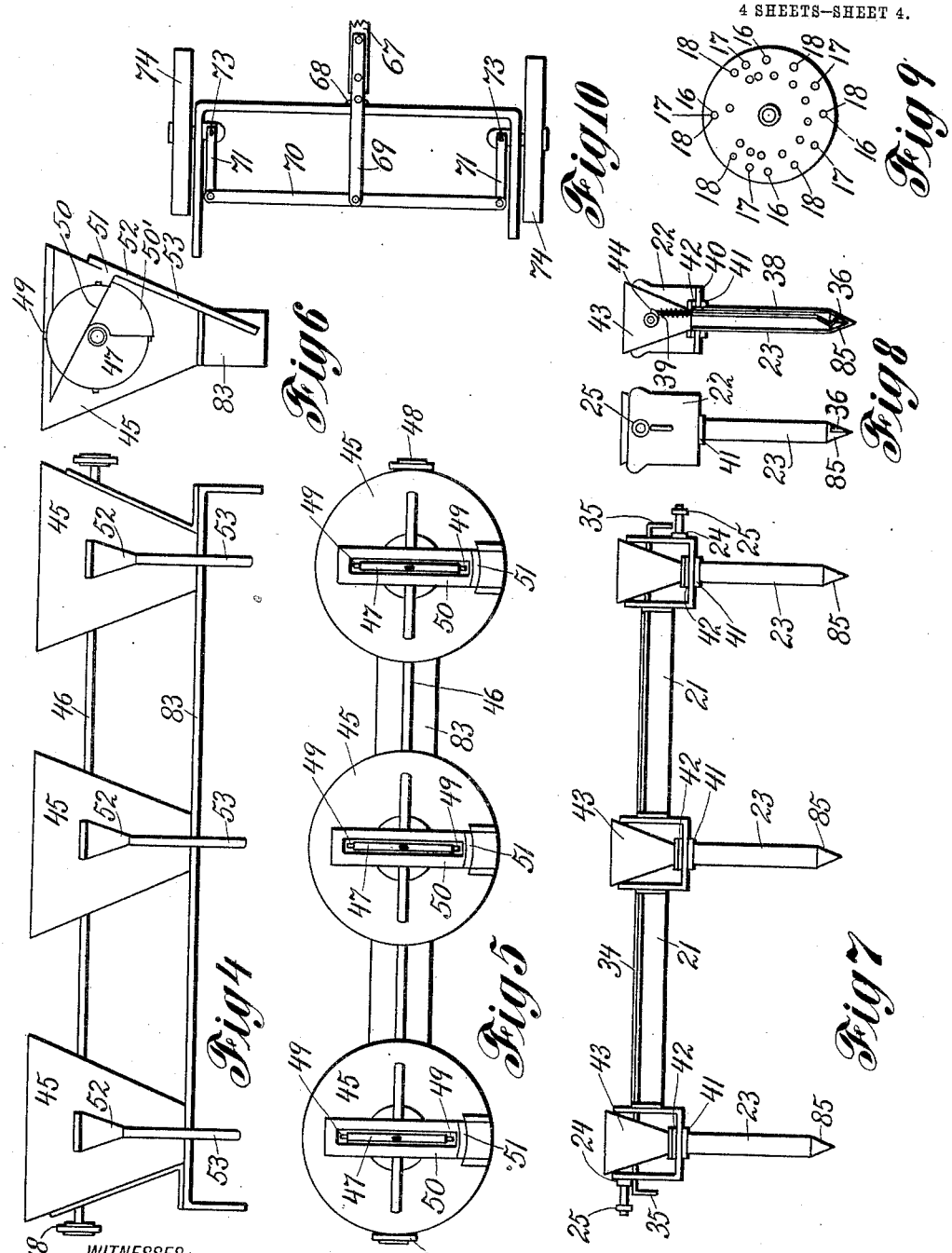

UNITED STATES PATENT OFFICE.

TOMÁS VEGA Y VEGA, OF BUENOS AIRES, ARGENTINA.

SOWING-MACHINE.

1,098,416.  Specification of Letters Patent.  Patented June 2, 1914.

Application filed May 21, 1913. Serial No. 769,031.

*To all whom it may concern:*

Be it known that I, TOMÁS VEGA Y VEGA, citizen of Argentina, residing at No. 934 Laguna street, Buenos Aires, Argentina, have invented certain new and useful Improvements in Sowing-Machines, of which the following is a specification.

This invention relates to machines for planting seed in the ground, and has for its object to provide a machine which will, within certain limits, place the seed in the ground at any desired depth and any distance apart in the rows and between the rows.

In the accompanying drawing: Figure 1 is a perspective view of the entire machine; Fig. 2 is a substantially central longitudinal vertical section of the machine; Fig. 3 is a side elevation; Figs. 4, 5 and 6 show the distributing devices in side elevation, plan and end elevation, respectively; Figs. 7 and 8 show the sowing devices in elevation and transverse section; Fig. 9 is an elevation of a distance plate, and Fig. 10 is a plan of the steering mechanism.

The driving wheel 1 has a toothed hub 2 whose teeth engage with the teeth 3 of the clutch 4, in order to couple the axle 5 to the driving wheel 1. The axle 5 revolves within the bearings 6 secured by means of their ears to the framing 7. On the ends of said axle are keyed two sprocket wheels 8 which serve to transmit its motion by means of the chains 9 and the sprocket wheels 10 to the shaft 11. On the shaft 11 are keyed the sprocket wheels 10, 12, and the pair of distance plates 13. On the distance plates are secured the arms 14 by means of screws which pass through the holes 16, 17 and 18, according to the distance at which the seed is to be placed. The holes 16, 17 and 18 are on the vertices of imaginary geometrical figures, such as a square, pentagon and hexagon, respectively, and serve for affixing four, five or six arms 14, thus varying the distance between the seeds as will appear hereinafter. Each arm 14 is provided with a slot 19 wherein slide grooved pieces 20 secured to the supporting rods 21 carrying the boxes 22 carrying the sowing devices 23. The rods 21 are bent at the ends and are secured by means of screws to the boxes 22. The boxes 22 situated at the ends have secured thereto brackets 24 carrying wheels 25, adapted to run in guide tracks 26 of the plates 27 and 28. The structures comprising the pieces 20, 21 and 22 are dismountable, thus permitting the placing on of the arms 14. The piece 20 is divided in two parts for permitting the affixment of the arm 14 and is secured to the rod 21; the groove of the piece 20 has for its purpose to prevent the lateral displacement of the structure formed by the pieces 21, 22, 24 and 25. The plates 27 and 28 are formed with flanges 29 which form the guide tracks 26 which control the course of the wheels 25 and therefore the rods 21 and sowing devices. The plate 30 serves as seat for the plates 27 and 28 in the framing 7. Dismountable racks 31 are secured to the plates 27 and 28. Said plates 27 and 28 are also provided with stops 32 and 33, respectively, which serve to turn the rod 34 when the appendix 35 thereof comes against said stops. The plates 27 and 28 are connected together at their upper part by means of the plate 83 which supports at the same time the seed distributing boxes.

The sowing mechanism 23 comprises a tube provided with a point 85 which has a door 36. The rod 36' of said door 36 is connected to a small rod 37, connected to another rod 38 provided at its upper end with a spring 39 resting on a small seat 40 and which normally presses the rod upward in order to keep the door 36 closed. The sowing device is also provided with a ring 41 engaging the box 22, and a threaded washer 42 which hold the sowing device to said box. The box 22 carries a hopper 43 or funnel leading into the tube of the sowing device. As stated, rod 34 is provided at its ends with appendices 35 which strike against the stops 32, thus causing the rod to revolve and the cams 44 to act on the rod 38 of the sowing device and open the door 36.

The distributing devices comprise three bins 45, through which passes the shaft 46, provided with the distributing disks 47 and the sprocket wheels 48 for communicating thereto motion from the shaft 11 by means of the chains 54 and the sprocket wheels 13. The disks which revolve within the bins 45, are provided with the seed charging devices 49; these seed charging devices pass into the seed or grain and charge themselves with one, two or more grains, according to the dimensions of the charging devices used. The distributing devices also include an inclined piece 50, with lateral pockets or shields 50', for preventing the seed from returning to the bin 45; the inclination of said piece is such that the lower end of the piece coincides with an opening 51 provided in the bin 45 and which gives passage to the grains, allowing them to fall into the box 52 which ends in a tube 53. The bins 45 are provided with covers 82.

The mechanism for adjusting the depth of sowing, comprises a handwheel 55 fixed to the shaft 56 provided with the gear 57; the axle passes through a bearing 58 in the bracket 58' and carries at its lower end a gear 59 which engages with the gear 60 secured to the shaft 61; said shaft 61 passes through the framing 7 which serves as bearing for the same and carries at its ends gears 62 which engage with the gears 63 keyed to the shafts 64 revolving in the bearing 65 mounted on the framing 7. Said shafts 64 are provided with the cylindrical gears 66 which engage with the racks of the plates 31, thereby raising or lowering the entire sowing mechanism.

The machine is steered by means of a pole 67 revolving on a stud 68 mounted on the framing 7. Said pole is provided at the rear with a piece 69 jointed to the bar 70 at the middle thereof; this bar is jointed to the bars 71 introduced into a socket of square section formed at the upper part of the shaft 72; these shafts have a crank for receiving the wheels 74 and revolve in the bearings 73 screwed to the framing 7. The wheels 74 only serve for supporting and steering the machine. The driving wheel 1 is protected at its upper part by a guard 75 which also serves for protecting the driver and provides a resilient support for the seat 76 for reducing the jars caused by the unevenness of the soil. The seat 76 is connected to the guard 75 by means of the support 77. Chains 78 are suspended from the framing 7 and serve for dragging along the earth destined to cover the holes left by the sowing devices. The disk 79 serves for marking the next furrow to be followed. The earth may be turned to the right and the left. The rods 80 serve to aline the machine at the entrance of the field to be sown, so that the seed may be sown in lines which are marked out by referring to certain points on the field.

The framing 7 is formed of four double T irons, connected together. The track pieces 81 fixed to the framing 7, have the shape of a sector of a circle with the center at the axle 5 and have for a purpose to prevent the distance of the axles 5 and shaft 11 from being varied during the raising or lowering of the sowing device.

The several mechanisms which constitute the above described machine, permit the same to be constructed of any size as regards the number of rows to be sown in one operation, that is, the same may be made to sow three, four, five, six or more rows, without the necessity of any modification in the general arrangement and construction of the machine and that of any of its mechanism.

The working of the machine is as follows:—After starting the machine and on coupling the driving wheel 1 by means of the clutch 4 to the axle 5, this latter will be caused to revolve, thus starting the sprocket wheels 8 which transmit motion by means of the chains 9 to the sprocket wheels 10 keyed to the shaft 11. In consequence, the plates 13 and the arms 14 will also revolve and operate the structure formed by the rods 21, boxes 22, sowers 23 and the pieces 20, 24 and 25. The wheels 25 will run in the tracks 26, causing the movement to be even and without heavy strain. On being thus started, the sowing devices will pass with their hoppers or funnels 43 below the tubes 53 wherefrom they receive the seeds which fall from the distributing devices through the tubes 53. The seeds enter into the funnels 43 and lodge themselves at the points 85 of the sowing devices which when moving about, strike the soil and enter the same by the driving action of the arms 14 on the rods 21, and form the hole wherein the seeds will be placed; after having entered sufficiently into the earth and after rising the necessary distance in order that the door 36 may be opened without difficulty, the tails 35 of the rod 34 will strike against the stops 32 and 33 of the plates 27 and 28, thus causing the rod 34 to turn through a certain angle; this will operate the cams 44 which will push on the rods 38 causing them to open the door 36, allowing the seeds to fall, which finishes the sowing operation. After the tails 35 pass the stops 32 and 33, the rod 34 returns to its original position under the action of the springs 39 on the cams 44; and simultaneously the doors 36 will be closed by the action of the same springs on the rods 38 which pushes the doors upwardly, after which the sowing device is ready to receive fresh seeds. During this operation, the distributing device was being operated, by motion transmitted from the shaft 11 through the sprocket wheels 12, 48, the chains 54 and the shaft 46, during which movement the disk 47 revolved within the seed and the charging device 49 charged itself and turned its charge into the openings 51 after which the seeds fall by gravity through the box 52, tube 53 and into the funnel or hopper 43 at the moment when this latter passed by. As the machine advances, the chains 78 drag earth into and cover the holes made by the sowing devices, and thus the operation is finished.

The number of seeds to be deposited by each sowing device, may be varied by changing the charging pieces 49. There are provided as many charging devices as there are sowing devices in each row.

From the foregoing it will be understood that the present machine permits placing the seed into the earth without the necessity of opening a furrow, sowing the seed at the exact distances desired, which may be varied at will, and sowing in transverse, longitudinal and diagonal straight lines, which permits cultivation in these directions, and even the individual treatment of each plant or group of plants according to whether one or several seeds are deposited at one time; it also permits adjusting the depth of sowing at will, so that the seed may be sown in accordance with the nature and the hygrometric conditions of the soil.

I desire it to be clearly understood that the minor details of the construction and arrangement of the machine may be varied without departing from the scope of this invention.

I declare that what I claim is:—

1. In a sowing machine, the combination of a frame; a rotatable shaft supported thereon; distance plates on said shaft and each provided with a plurality of groups of equidistantly placed perforations; a plurality of arms; means engaging in said perforations for fixing the arms to the plates; rods carried on said arms; sowing devices on said rods; and means for rotating the distance plates.

2. In a sowing machine, the combination of a frame; means for supporting the frame; vertically movable side plates having endless tracks on their inner faces; a rotatable shaft passing through said side plates; means for rotating the shaft; distance plates on said shaft; arms fixed to said distance plates; pieces longitudinally movably supported on said arms; carrying rods supported in said pieces and engaging in said tracks; sowing tubes hung to the said rod and each provided with a door; means for opening said door at a point during the travel of the tubes; and means for feeding seed to the tubes.

3. In a sowing machine, the combination of a frame; a bin supported over the frame; a chute associated with the bin; a rotary disk having pockets thereon adapted to pick up seed from the bin and periodically drop them into the chute; a plurality of sowing tubes; a revolving means for periodically passing said tubes under said chute and then projecting them into the ground; and an operating connection between the revolving means and the rotary disk for synchronizing the dropping of the seed from the chute with the passage of the tube under the chute.

4. In a sowing machine, the combination of a frame; a rotary axle mounted thereon; radial arms mounted on the axle; sowing devices mounted on the arms and movable longitudinally of the arms; engaging devices connected to said sowing devices; and curved tracks receiving the engaging devices and guiding said sowing devices.

5. In a sowing machine, the combination of a frame; wheels supporting said frame; a rotatable axle adjustably supported over said frame; distance plates mounted on said axle; groups of arms fixed to said distance plates; carrying rods rotatably mounted between corresponding pairs of arms and movable longitudinally of the arms; means secured to said frame for guiding said rods as said arms revolve; sowing tubes hanging from said rods and each having a door at its lower end; a stop on said frame; means connected to said doors and adapted to engage said stop and cause the doors to open; means for connecting said axle and one of said wheels for rotating the axle; bins mounted above the path of said tubes; a disk in each bin and adapted for rotation by said axle; and pockets on said disks adapted to discharge seed into said tubes as they pass under the bins.

6. In a sowing machine, the combination of a frame; wheels supporting said frame; vertically movable side plates provided with curved tracks on their inner faces; manually operated means for adjusting the height of the side plates; a rotatable axle passing through said side plates; distance plates mounted on said axle and each provided with a plurality of groups of equidistantly placed perforations; groups of arms affixed to said distance plates by means of said perforations, each arm being provided with a longitudinal groove; circular pieces slidably disposed within corresponding opposite pairs of said grooves; carrying rods supported by said circular pieces; guide wheels secured to the carrying rods and adapted to move in said tracks; sowing tubes hung on said rods and each provided with an open upper end and a door at the lower end; an actuating rod supported above each carrying rod and passing through the upper part of the sowing tubes, and provided with an angular appendix; stops in the lower part of said side plates and adapted to engage said appendices and partially rotate the rods; connections between said rods and doors for opening the doors when the rods are rotated; an operative connection between said axle and one of said wheels for rotating said axle and moving rearwardly said sowing tubes, when in their lowest position, at a speed substantially equal to the forward speed of the machine; bins mounted above said frame; chutes discharging from said bins and under which said tubes pass; a disk mounted in each bin; an operative connection between said axle and disks for rotating the disks; and pockets on said disks for dropping seed into said chutes as the tubes are passing thereunder.

In testimony whereof I affix my signature in presence of two witnesses.

TOMÁS VEGA y VEGA.

Witnesses:
J. H. AINSWORTH,
A. R. SERZ.

Copies of this patent may be obtained for five cents each, by addressing the "Commissioner of Patents, Washington, D. C."